(12) United States Patent
Aoyama

(10) Patent No.: US 6,342,020 B1
(45) Date of Patent: Jan. 29, 2002

(54) METAL BELT

(75) Inventor: Hideaki Aoyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/455,905

(22) Filed: Dec. 7, 1999

(30) Foreign Application Priority Data

Jan. 8, 1999 (JP) ............................................ 11-002733

(51) Int. Cl.[7] .............................. F16G 1/22; F16G 5/16
(52) U.S. Cl. ........................ 474/242; 474/240; 474/201
(58) Field of Search ................................. 474/242, 245, 474/240, 201, 238, 261, 244, 246, 247, 237

(56) References Cited

U.S. PATENT DOCUMENTS

| | | | | |
|---|---|---|---|---|
| 4,824,424 A | * | 4/1989 | Ide et al. | ...................... 474/242 |
| 4,826,473 A | * | 5/1989 | Miyawaki | .................... 474/240 |
| 5,004,450 A | * | 4/1991 | Ide | .............................. 474/242 |
| 5,169,369 A | * | 12/1992 | Masuda et al. | ............. 474/242 |
| 5,342,251 A | * | 8/1994 | Kanehara et al. | ........... 474/242 |

FOREIGN PATENT DOCUMENTS

| | | | |
|---|---|---|---|
| EP | 278545 | * | 8/1988 |
| EP | 0 377 918 | | 7/1990 |
| EP | 0 626 526 | | 11/1994 |
| JP | 62-131143 | | 8/1987 |
| JP | 280946 | * | 11/1988 ................. 474/242 |
| JP | 58832 | * | 3/1989 |
| JP | 98733 | * | 4/1989 ................. 474/242 |
| JP | 2-225840 | | 9/1990 |
| JP | 7-12177 | | 1/1995 |

OTHER PUBLICATIONS

Patent Abstracts of Japan & JP-A 2-194864, Jul. 25, 1990.

* cited by examiner

Primary Examiner—David A. Bucci
Assistant Examiner—Marcus Charles
(74) Attorney, Agent, or Firm—Arent Fox Kintner Plotkin & Kahn PLLC

(57) ABSTRACT

A metal belt includes a pair of metal rings and a plurality of metal elements supported along the metal rings. Each metal ring includes a plurality of endless metal bands that are stacked on each other. Each metal element includes a nose portion and a corresponding hole and is constructed to satisfy a relationship that $L_\alpha/L_\beta > 0.8$ such that $L_\alpha$ is a lateral distance between the center of the nose portion and a contact point $P_\alpha$ defined when the metal element pivots about its nose portion to form point contact between one of the pair of lobes and a corresponding one of the pair of metal rings and $L_\beta$ is a lateral distance between the center of the nose portion and a contact point $P_\beta$ defined when the metal element pivots about its nose portion to form point contact between the other metal ring and the body portion.

3 Claims, 7 Drawing Sheets

METAL BELT

FIELD OF THE INVENTION

The present invention is related to a metal belt used as a power transmission means in a belt type infinite variable-speed drive and in particular to a metal belt that comprises metal element members.

BACKGROUND OF THE INVENTION

This type of metal belt is known from the past and has been disclosed in, for example, Japanese Laid-open utility model publication No. 62-131143(A) and Japanese Laid-open patent publication No. 2-225840(A). These metal V-belts are comprised by an endless belt shaped metal ring member and a plurality of metal element members supported along the metal ring member transmitting power between a drive pulley and a driven pulley. Both of these pulleys can variably control the V-channel width and by means of variably controlling the V-channel width of both pulleys, the wrapping radius of the V-belt on both pulleys can be changed and in addition the change gear ratio can be changed in infinite steps.

As described in, for example, the ASME: International Computers in Engineering Conference and Exhibition vol. 3 (1987) pp461–465, concerning the behavior of the metal element member s (hereinafter referred to as elements) during the operation of this type of metal V-belt, two regions are known to exist especially at the arcing portion directed away from the driven pulley towards the drive pulley. In one of these regions (close to the driven pulley outlet) a gap occurs between the front and rear element members and in the other region (close to the drive pulley inlet) no gap occurs between the front and rear elements and they are joined together.

The method stated in Japanese Laid-open patent publication No. 7-12177(A) is known concerning friction and improvements to the efficiency in this type of metal V-belt. In a metal V-belt, the geometric relationship between the pulleys and the belt causes the belt to travel imprecisely between the pulleys with the elements invading into the drive pulley in a state in which the elements are leaning somewhat within a plane at a right angle to the metal ring member (hereinafter referred to as ring). If this state is allowed to exist, friction of the V-surface and reductions in the power transmission efficiency will occur due to one side making contact with the pulley V-surface.

Thereupon, when the contact position between the innermost peripheral surface of the ring and an element and the distance in the horizontal direction between two contact positions of the outermost peripheral surface of the ring and an element is A and the clearance between the outermost peripheral surface of the ring and an element is B, the position of the contact point of the ring and the element is specified such that angle $\tan^{-1} B/A$ becomes smaller than 1 degree. By means of specifying the position is this manner, the ring restricts the oscillation angle of the element at the drive pulley inlet which in turn improves the friction and power transmission efficiency.

However, a definite method to set the angle $\tan^{-1} B/A$ to 1 degree or less is not disclosed in the above-mentioned applications. Furthermore, as stated in the above-mentioned applications and literature, in this type of metal V-belt it is necessary to ensure a sufficientdegree of freedom for the translation movement of the elements and for the forward and rearward leaning in order to restrict the thus termed closure movement that occurs in the outlet arcing portion of the driven pulley against the elements. This lead to a serious problem of appropriately setting the values A and B of the above equation.

Also, the front and rear elements mutually interact through both coupling portions in the unstable region of the driven pulley outlet arcing portion and in the pulley inlet portion when the pulley width changes. At this time the coupling portions are allowed to oscillate as a shaft center. This oscillation is restricted by contact between the ring and the element portion. At the contact portion at this moment, surface pressure acts on the ring and the element in proportion to the rotation moment of the element.

The magnitude of this surface pressure was greatly affected by the lifespan of the metal ring member that is comprised by a plurality of especially thin metal rings approximately 0.2 mm thick stacked on eachother and reducing this surface pressure was a major issue for improvements in the lifespan of the ring.

SUMMARY OF THE INVENTION

The object of the present invention is to restrict the oscillation angle without obstructing the forward and rearward leaning or the translation movement of the elements as well as stabilizing the state of the elements close to the pulley inlet.

Another object of the present invention is to reduce oscillation and noise by means of stabilizing the state of the elements, control the V-surface friction of the pulleys and improve the power transmission efficiency.

A further object of the present invention is to improve the durability of the ring that comprises the metal belt.

In the present invention the metal belt that transmits power between the drive pulley and the driven pulley is comprised by a metal ring member consisting of a plurality of endless belt shaped metal ring members stacked on each other (for example, ring 20 in the embodiment) and a plurality of metal element members supported along the ring (for example, element 10 in the embodiment). If the distance between where the outermost peripheral surface of the ring and the element make contact with the above-mentioned shaft center is $L_\alpha$ and if the distance between where the innermost peripheral surface of the ring and the element make contact with the above-mentioned shaft center is $L_\beta$, the metal belt MV will be comprised to have the relationship $(L_\alpha/L_\beta) > 0.8$ when the shaft that goes through the center of the coupling disposed on the front and rear surfaces of the element as well as passes through the principal plane of the element in the direction through the front and rear surfaces functions as a shaft center and the element is allowed to oscillate.

In other words, the elements of the metal belt of the present invention are comprised such that the oscillation angle is made smaller than conventional elements by means of shifting the contact point between the outermost peripheral surface of the ring (for example, 20a in the embodiment) when the elements oscillate and the surface facing the bottom of the elements (for example, the lower surface of the ear portion 12a in the embodiment) relative to the outermost peripheral surface of the ring toward outside of the pulleys.

Alternatively, the elements are comprised such that $\alpha < \beta$ when the ring is located at the center position of the element slot when the oscillation angle that causes the outermost peripheral surface of the ring and the surface facing the bottom of the elements relative to this surface is $\alpha$ and the oscillation angle that causes the innermost peripheral surface of the ring and the surface facing the top of the elements is β at the moment when the elements oscillate centered on the center shaft of the couplings in like manner to the above composition.

According to these types of compositions, it is possible to reduce the entire oscillation angle of the elements without narrowing the clearance between the elements and the ring (for example, total clearance $C_L$ in the embodiment). Namely. reductions in the oscillation angle can be achieved without restricting the translation movement of the elements and forward leaning angle (without sacrificing the closure movement of the elements).

Further, according to the above-mentioned compositions, the contact position when the elements oscillate and the outermost peripheral surface of the ring and the lower surface of the ear portion make contact shifts from the coupling center (shaft center) by an amount that equals the increase in the length of the arm of the moment. And when an oscillation movement having the same amount of movement occurs, the surface pressure acting on the ear portion and the outermost peripheral surface of the ring can be reduced.

Furthermore, the metal belt of the present invention is comprised such that the diameter of the approximate cylindrical shaped concave portion (for example, hole 15 in the embodiment) is larger than the diameter of the approximate cylindrical shaped convex portion (for example, nose 14 in the embodiment) at the front and rear couplings (namely, has a gutter when joined).

The above-mentioned composition makes it possible to increase the clearance between the couplings of the front and rear elements while maintaining the element oscillation angle identical to a conventional case. Consequently, this makes it possible to increase the allowable width with respect to the coupling center shifting between the front and rear elements at the driven pulley outlet portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 3:
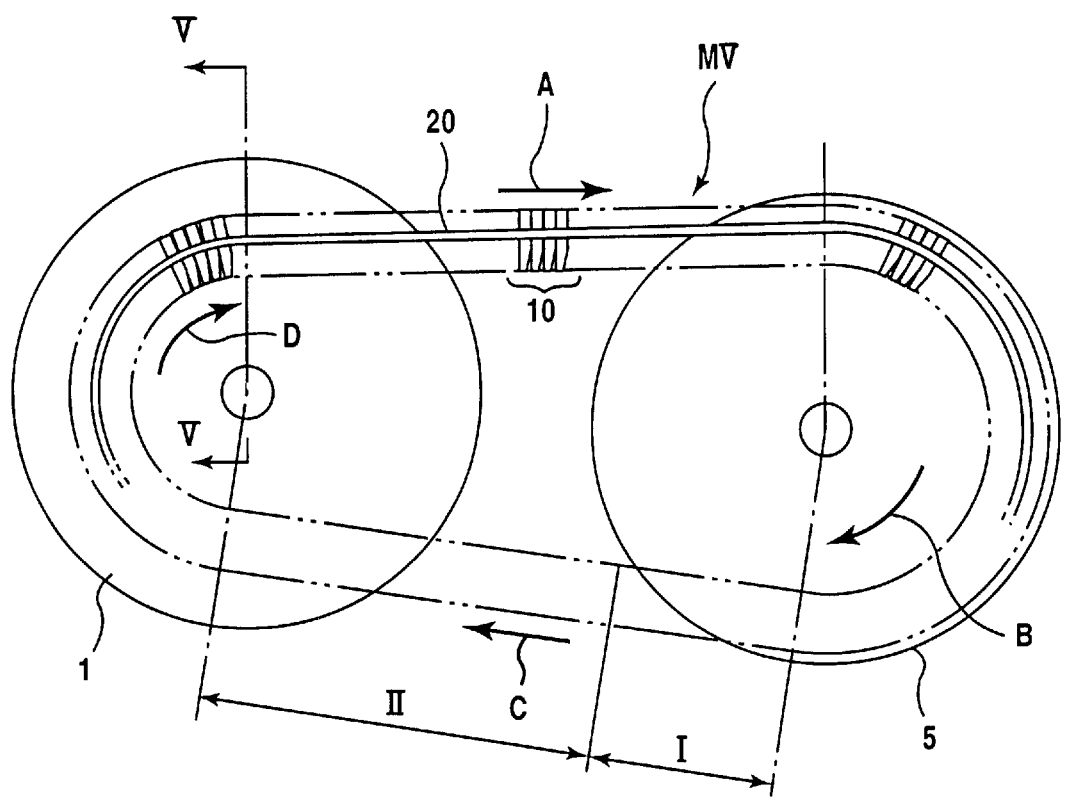
FIG. 3 is a schematic view showing a state in which the above-mentioned metal belt is wound on the drive pulley and the driven pulley.

As shown in FIG. 3, the metal belt MV of the present invention is comprised by the ring 20 (metal ring member) that comprises a plurality of endless belt shaped rings stacked on each other and a plurality of elements 10 (referred to as metal element members or blocks) supported along the ring 20. The V-channel width is variably controlled as seems appropriate by a motive power means, such as oil pressure (hydraulic), transmitting power between the drive pulley 1 and the driven pulley 5.

Figure 5:
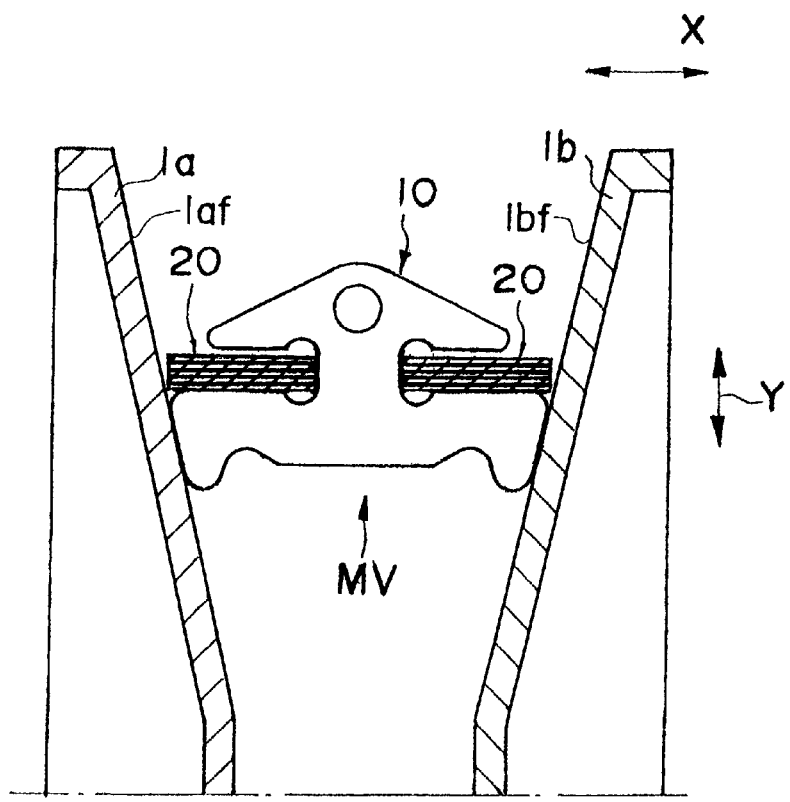
FIG. 5 is a cross-sectional view showing the metal belt in a state wound on the drive pulley.

FIG. 5 shows the metal belt in a state wound on the drive pulley 1. In this figure, the elements 10 are moved in a state in which they mesh inside the V-channel of the drive pulley 1 that is comprised by a fixed pulley half body 1a and a movable pulley half body 1b. The movable pulley half body 1b is arranged to be freely movable in the axial direction of the pulley (direction indicated by the X axis in the figure) and by means of moving the movable pulley half body 1b in this direction, the pulley V-channel is changed which changes the winding radius of the metal belt MV. An identical method can be used to vary the winding radius of the metal belt for the driven pulley 5 as well. The change gear ratio between both pulleys can be freely adjusted in infinite steps by means of controlling the winding radius of both pulleys.

Figure 1:
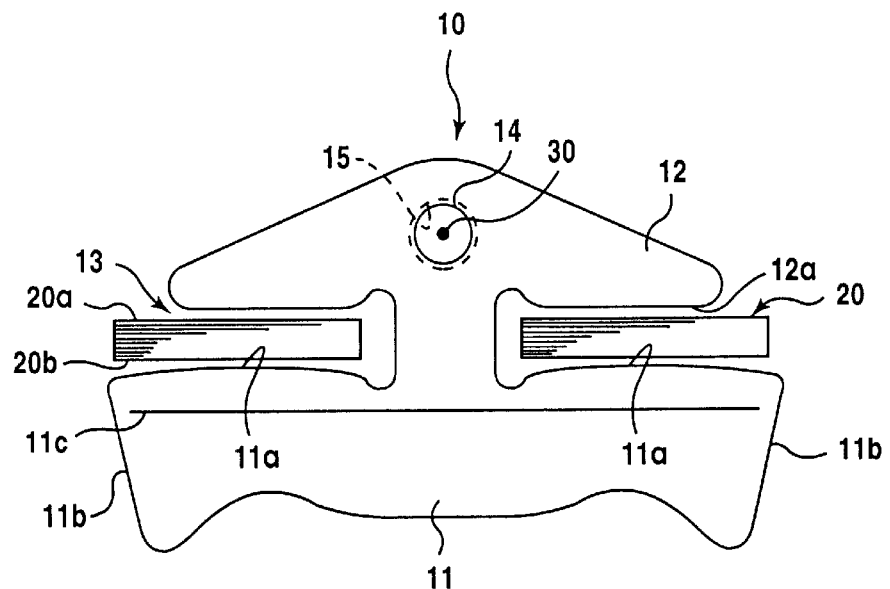
FIG. 1 is a front cross-sectional view showing the metal belt of the present invention.
Figure 2:
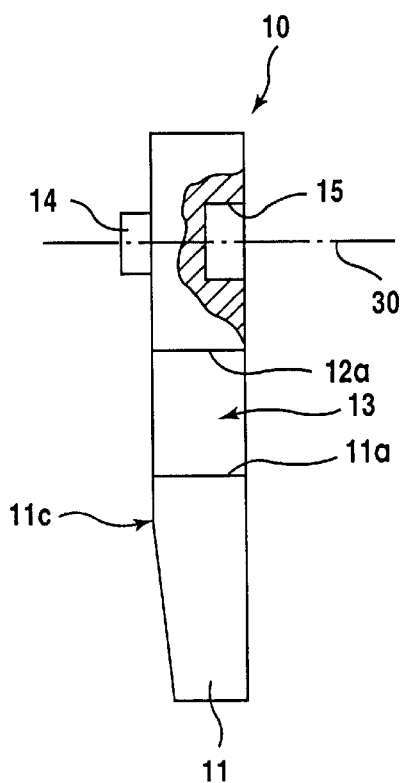
FIG. 2 is a side view of the metal element member of the above-mentioned metal belt.

FIG. 1 and FIG. 2 show more detail of the metal belt of the present invention. From among these two figures FIG. 1 shows a front view of the metal belt and FIG. 2 shows a right side view of the element of the metal belt. This element 10 has a body portion 11 that comprises a V-surface 11b on either side which make contact with the V-channel surface of the pulley and an ear portion 12 that extends upward from the center of the body portion 11 stretching to both sides. A saddle surface 11a is formed on the either side of the upper surface of the body portion 11 and a retention surface 12a is formed on the lower surface of either side of the ear portion 12. Further, a pair of slots 13 are formed on either side between the saddle surface 11a and the retention surface 12a. In addition, a pair of rings 20 (metal ring member) are inserted and accepted within the slot 13 on either side. In this manner, a metal belt MV is comprised that retains a plurality of elements by means of arranging the plurality of elements 10 along the ring 20.

An approximate cylindrical shaped convex portion 14 (nose) is formed on the upper portion of the front surface of the element 10 and an approximate cylindrical shaped concave portion 15 (hole) is formed at a position identical to the axle on the rear surface of the element. This concave portion 15 links with the convex portion of the rear element. Joining both portions is called a coupling.

Close to the outlet of the drive pulley 1 each element 10 is successively pressed against the driven pulley 5 by means of elements 10 which are send forward from the drive pulley 1 one-by-one. This pressing force transmits rotational torque of the drive pulley 1 to the driven pulley 5. Consequently, a compressive force acts on each element 10 at the belt arcing portion from the drive pulley 1 towards the driven pulley 5 without any gap existing between each element. In contrast, rotational torque transmits to the driven pulley 5 and a tensile force acts on the ring 20 at the belt arcing portion from the driven pulley 5 towards the drive pulley 1. However, clearance between the elements of the entire periphery of the belt accumulates at the return arcing portion of the belt causing gaps to occur without a tensile force acting on each element 10 because each element 10 is an independent plate-shaped body.

Hereupon, when this gap is allowed at the winding portion of the drive pulley 1, intermittent pressing of the elements 10 occurs at the outlet of the drive pulley 1. Not only does this cause oscillation and noise but also greatly influences the lifespan of the belt as well.

Thereupon, the (elements are comprised in this type of metal belt to form a line without any gap between each element before reaching the inlet of the drive pulley. This is achieved by means of setting the center of gravity of the element outside the pitch circle radius of the pulley (rocking end 1c on the element). In other words, the release speed of the elements at the driven pulley outlet is stipulated at a speed exceeding the pitch circle radius of the driven pulley. Further, because the peripheral speed at the position at the center of gravity on the outside that is more than this pitch circle radius is faster than the peripheral speed that exceeds the pitch circle radius, the elements released from the driven pulley lean such that the position at the center of gravity is preceding and the ring protrudes towards the forward element to pull the element.

Figure 4:
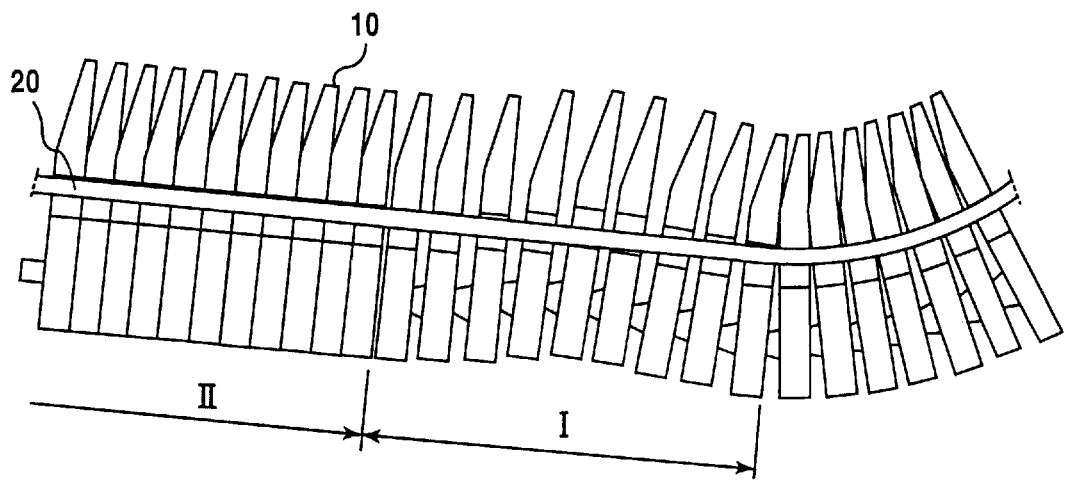
FIG. 4 is a descriptive view showing the behavior of the metal element members at the driven pulley outlet arcing portion of the metal belt.

FIG. 4 shows an enlarged view of this state. This figure is a partial enlarged view of the driven pulley outlet region from the driven pulley 5 to the drive pulley 1 shown in FIG. 3. As described above, the elements 10 protruding from the driven pulley 5 move at a speed faster than the peripheral speed of the belt 20 toward the forward pulley in a slightly leaning state at the region of the belt arcing portion from the driven pulley 5 towards the drive pulley 1 where clearance between each element accumulates and gaps occur. This moving speed difference causes the element released from the driven pulley 5 to catch up with the forward element at the belt arcing portion from the driven pulley 5 towards the drive pulley 1. In other words, as shown in the figure, there is a region where no gaps exist between the elements (region II of FIG. 3 and FIG. 4) and a region where gaps exist before catching up with the forward element (region I of FIG. 3 and FIG. 4). Moving the elements in this manner such that the gaps between the elements and the forward elements (pieces) fit close together is called closure movement of the elements.

On the one hand, in region 1 where gaps exist, forward lean and translation movement (closure movement) are carried out as the overall movement direction of the elements 10 and on the other hand, while a restriction produced by the linkage of the front and rear couplings 14, 15 and a restriction produced by the ring 20 are being received, the elements within the range of these restriction conditions are allowed to move freely.

From among these, the clearance between the ring 20 and the slot 13 of an element is set larger than the clearance between the nose 14 and the hole 15 of the coupling such that it does not interfere with the closure movement and as a result the elements oscillate and move with the linking axis of the coupling as the center.

This oscillation movement is controlled by means of contact between the saddle surface 11a or the lower surface of the ear portion 12a of the elements and the ring 20. A surface pressure proportional to the amount of movement of the elements acts on the contact point between the ring during this control. Further, elements which are put between the region without a gap (region II of FIG. 3 and FIG. 4) in a state when a large oscillation angle exists cause one-sided contact with the pulley V-surface (1af or 1bf) at the drive pulley winding portion which results in V-surface friction.

Because of this, this oscillation angle is made smaller in the elements 10 of the metal belt MV of the present invention without interfering with the closure movement of the elements. Even further, the length of the ear portion 12 is extended in order to control the surface pressure that occurs on the outermost peripheral surface of a ring 20a. The metal belt MV is comprised to have the relationship $(L_\alpha/L_\beta) > 0.8$ when this element is oscillated with the shaft center 30 of the coupling functioning as the shaft center if the distance between the outermost peripheral surface of the ring 20a and the lower surface of the ear portion 12a, and the contact point $P_\alpha$ and the above-mentioned shaft center 30 is $L_\alpha$ and the distance between where the innermost peripheral surface of the ring 20b and the saddle surface 11a, and the contact point $P_\beta$ and the above-mentioned shaft center 30 is $L_\beta$ as shown in FIG. 6.

Furthermore, the metal belt MV is comprised to have the relationship $\alpha < \beta$ if the oscillation angle that causes the outermost peripheral surface of the ring 20a and the lower surface of the ear portion 12a to make contact is $\alpha$ and the oscillation angle that causes t he innermost peripheral surface of the ring 20b and the saddle surface 11a to make contact is $\beta$ when the element is oscillated with the shaft center 30 of the coupling functioning as the shaft center in like manner as described above in a state wherein the ring 20 is located at the center position of the slot 13.

Figure 6:
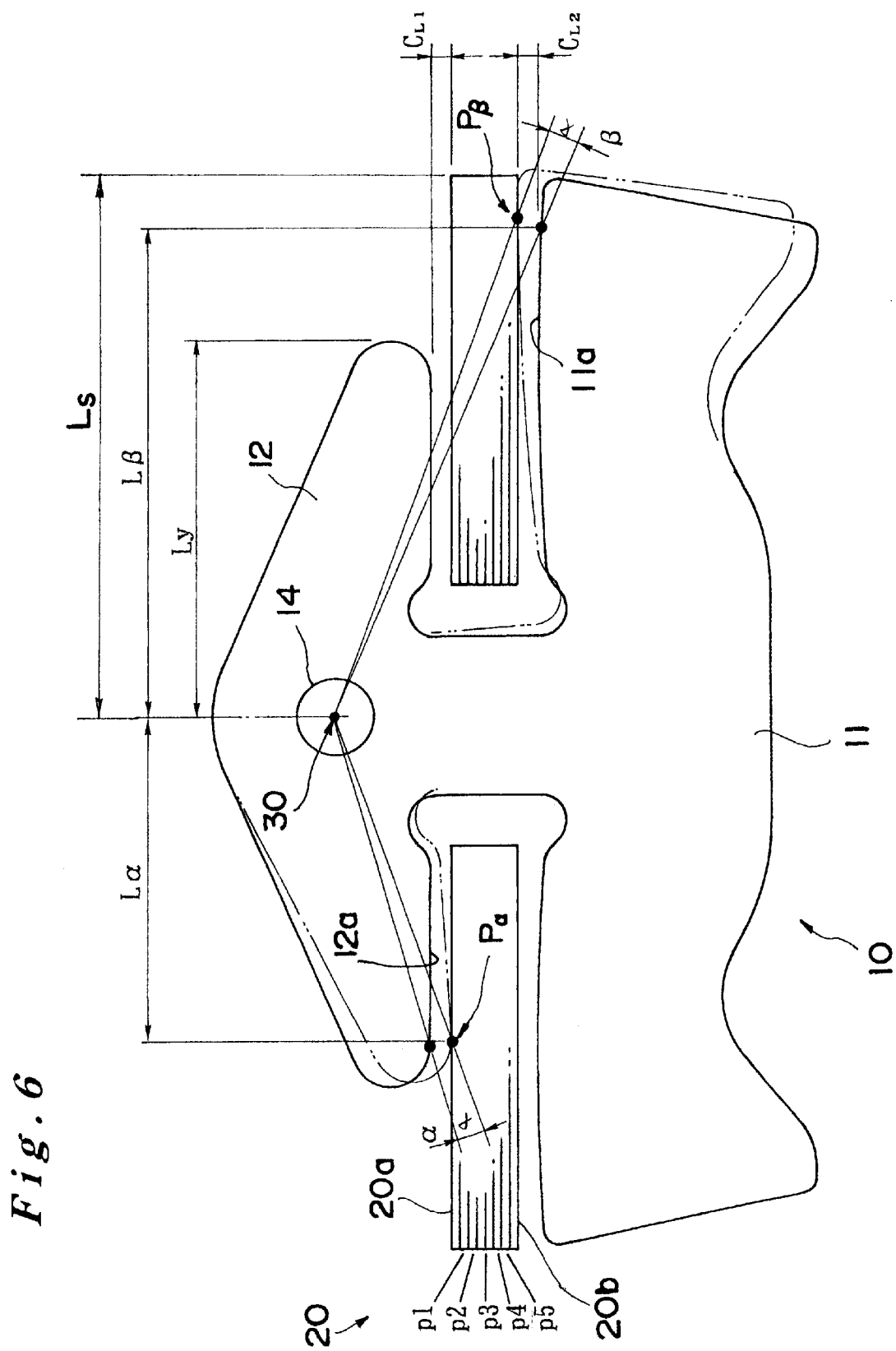
FIG. 6 is a descriptive view showing the relationship between the metal element members of the metal belt and the metal ring member.

Moreover, p1~p5 shown in FIG. 6 show the relative positional relationship between the element 10 and the ring 20. When the ring 20 is located at the center position with respect to the slot of the element 10, the position is p3. This relationship shows the position when the position of the ring 20 shifts in steps of 0.05 mm upward and downward (direction of the thickness of the belt). For example, p2 shows the ring 20 0.05 mm above the slot center. The clearance between the element and the ring when the ring is located at the center position (position p3) is $C_{L1}=C_{L2}=0.133$ mm identical to a conventional example and the length of the end of the saddle surface $L_S$ is fixed at $L_S=12$ mm which is also identical to a conventional example.

Figure 7:
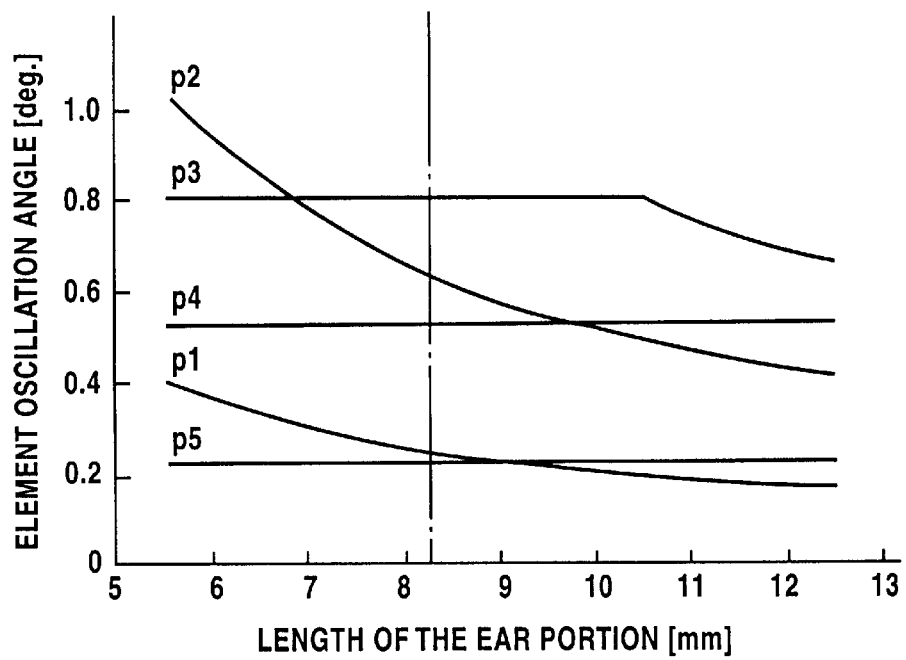
FIG. 7 is a graph showing the relationship between the length of the end of the ear portion of the metal element member and the oscillation angle.

FIG. 7 shows change states of the oscillation angle (contact angle, either $\alpha$ or $\beta$) of the elements up to contact between the ring and element when the length of the end of the ear portion $L_Y$ is changed and the length of the end of the saddle surface $L_S$ is fixed at a conventional value for each of the above-mentioned relative positions p1~p5.

To begin, the oscillation angle of the elements will not change even if the length of the end of the ear portion $L_Y$ is extended just before contact is made with the pulley V-surface at positions p4, p5 where the ring 20 is positioned downward within the slot of an element 10. This indicates that the oscillation angle is specified such that the innermost peripheral surface of the ring 20b always makes contact with the saddle surface 11a of the element when the ring is located at positions p4, p5. The oscillation angle at this time is β which is a fixed value because the length of the end of the saddle surface $L_S$ is fixed.

In contrast, the oscillation angle within the entire of the graph changes when the length of the end of the ear portion $L_Y$ is changed at positions p1 and p2 (relative positions of the elements and the ring). This indicates that the oscillation angle is specified such that the outermost peripheral surface of the ring 20a always makes contact with the lower surface of an ear portion 12a of the element at these positions and it is understood that there is an effect (oscillation angle controlling effect) of the oscillation angle becoming smaller by means of lengthening the length of the end of the ear portion $L_Y$. In other words, the oscillation angle is specified as α which is a variable of the length of the end of the ear portion $L_Y$.

Further, when the relative position of the elements and the ring is position p3 as well as when the ring 20 is positioned exactly at the center position with respect to the slot 13 of an element, a region exists where the oscillation angle of the element 10 changes due to the length of the end of the ear portion $L_Y$ and a region exists where there is no change. As is clear from the description up to this point, this means that the region where the oscillation angle does not change is a region where the innermost peripheral surface of the ring 20b and the saddle surface 11a of the element make contact in advance and the region where the oscillation angle changes is a region where the outermost peripheral surface of the ring 20a and the lower surface of an ear portion 12a of the element make contact in advance.

From the relationship between the oscillation angle of the length of the end of the ear portion $L_Y$ and the element at position p3, the controlling effect of the oscillation angle exhibits itself when the length of the end of the ear portion $L_Y$=8.25 mm has a relationship of $L_Y$>=10.5 mm in conventional technology when the ring 20 is positioned at the center of the slot 13 of an element. Even further, the existence of the oscillation angle controlling effect at this central position p3 means there is an oscillation angle controlling effect at a region where the relative positional relationship obtainable by the ring 20 and the element 10 is 50% or more (regions p1~p3 or higher).

In addition, looking at FIG. 7, the controlling effect of the oscillation angle when, for example, the length of the end of the ear portion $L_Y$ is 12 mm, is approximately 0.144 deg. (14.3%) at position p3 and approximately 0.216 deg. (33.8%) at position p2 making it clear there is a great effect.

Figure 8:
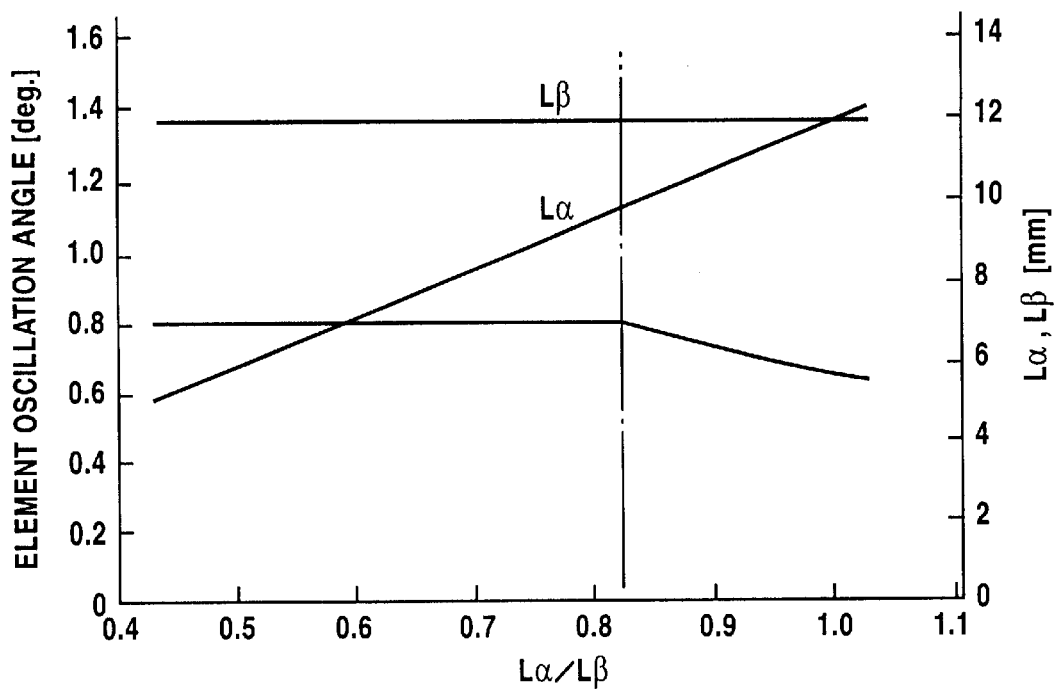
FIG. 8 is a graph showing changes in the oscillation angle when the distance up to the contact point between the lower surface of the ear portion of the metal element members and the metal ring member is changed.

In FIG. 8 the change state of the oscillation angle at position p3 in FIG. 7 is not the length of the end of the ear portion $L_Y$ but is represented by the distances $L_\alpha$ and $L_\beta$ from the coupling center 30 to the contact point and further shows the change state of the oscillation angle of the above-mentioned element that is specified by these ratios $L_\alpha/L_\beta$. Additionally, the actual measured values of $L_\alpha$ and $L_\beta$ in FIG. 8 are both appended to the right vertical axis.

The region in FIG. 8 where $L_\alpha/L_\beta$ (indicated by the dashed line) is 0.822 or more is equivalent to the region in FIG. 7 where the length of the end of the ear portion $L_Y$ is 10.5 mm or more and is the range of the region where the controlling effect of the oscillation angle is obvious due to the extension of the length of the end of the ear portion in the region where the relative positional relationship obtainable by the ring 20 and the element 10 is 50% or more. Furthermore, this region is the region where oscillation angle α<β when the ring is located at the central position (position p3) of the slot 13 of an element. This is the region that represents the metal belt of the present invention.

The maximum value of this region is specified from the positional relationship between the pulley V-surfaces 1a, 1b and the end of the ear portion and is set within a range in which the end of the ear portion does not make contact with the pulley V-surface. The relationship between the element 10 and the pulley at the pulley winding portion is determined by both V-surfaces and the rocking end which leads to the position of the elements being made unstable as well as causing the power transmission efficiency to worsen. Further, a reactive force generates from the pulley V-surfaces to the ear portion when the end of the ear portion makes contact with the pulley V-surfaces. Reinforcements would become necessary to account for this reactive force but are not advised taking into consideration the strength of the elements.

Figure 9:
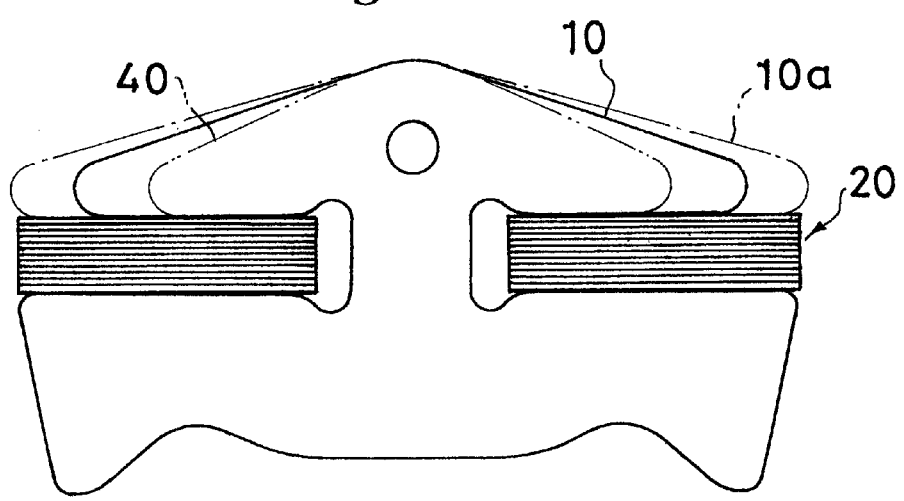
FIG. 9 is a descriptive view showing a comparison between the metal element members of the metal belt of the present invention and conventional metal element members.

FIG. 9 shows a comparative example between the element 10 of the metal belt of the present invention obtained in this manner and a conventional element 40. The conventional element 40 is represented by a chain double-dashed line and an example of the maximum value of the element of the present invention is represented by the dashed line as 10a.

Figure 10:
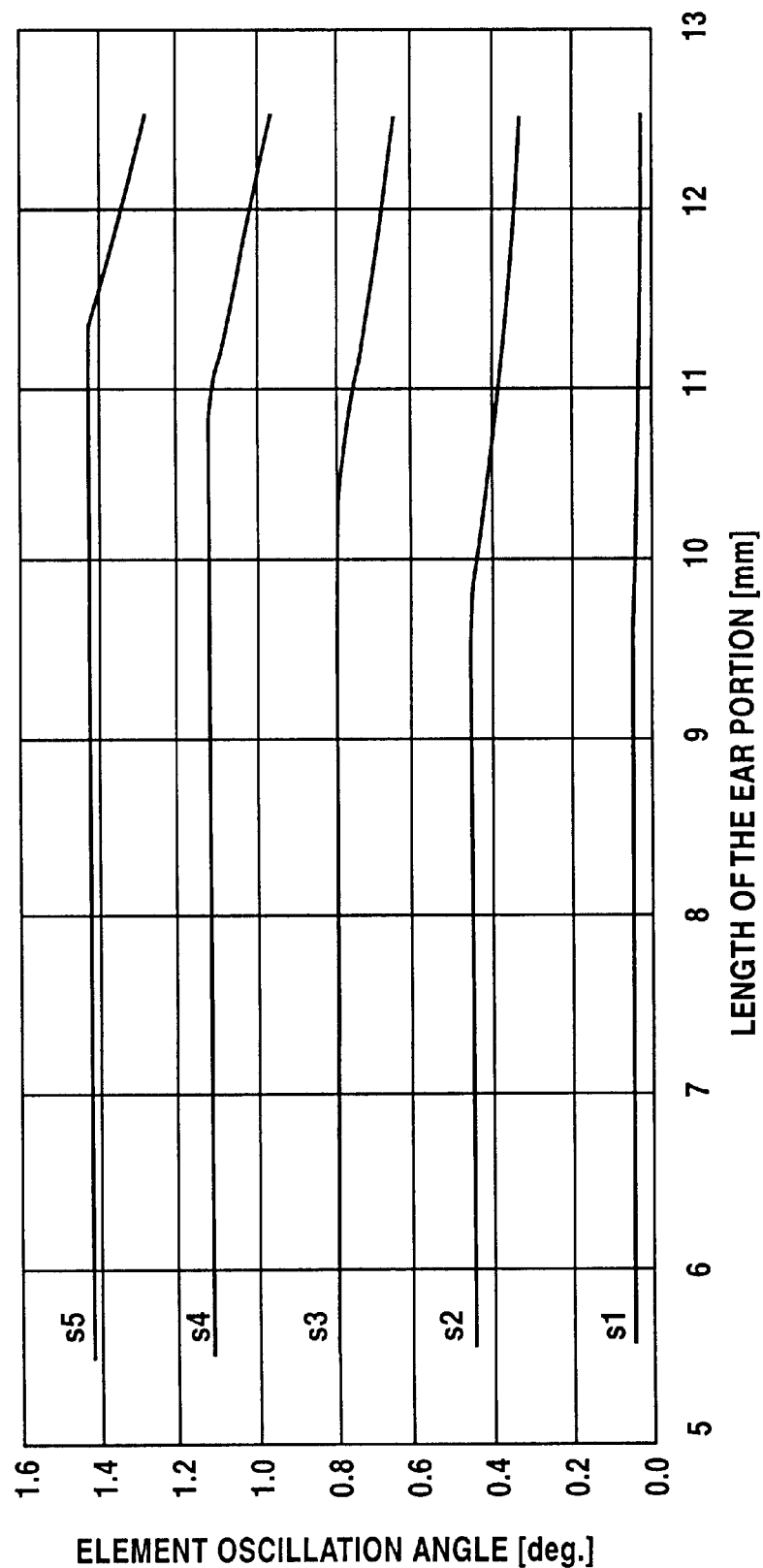
FIG. 10 is a graph showing changes in the oscillation angle when the clearance between the metal element members and the metal ring member is changed.

The description above was for a fixed value of clearance of the slot 13 of an element and the ring 20 ($C_{L1}=C_{L2}$=0.133 mm,*total clearance $C_L$=0.266 mm) although the above-mentioned oscillation angle controlling effect changes depending on this clearance. FIG. 10 shows the change state of the oscillation angle when this total clearance $C_L$ is changed from center value $C_L$=0.266 mm (position s3) in steps of +/−127 mm.

As shown in the figure, an extension effect of the end of the ear portion becomes noticeable as the clearance between the ring 20 and the element 10 becomes smaller. For example, a region where α<β can be obtained in a region where the length of the end of the ear portion is 9.7 mm or more at position s2 where the total clearance $C_L$ is 0.127 mm smaller than center value $C_L$.

Furthermore, looking at this figure it is also possible to, for example, find a clearance value that can be expanded when the oscillation angle of an element is identical to a conventional element. In other words, although it is not shown in the figure, the total clearance (where the oscillation angle of an element is 0.8 deg. of a conventional angle when the length of the end of the ear portion is 12 mm) is between s3 and s4 making it possible to find the total clearance $C_L$ by means of specifying the length of the end of the ear portion and two oscillation angles of elements.

Figure 11:
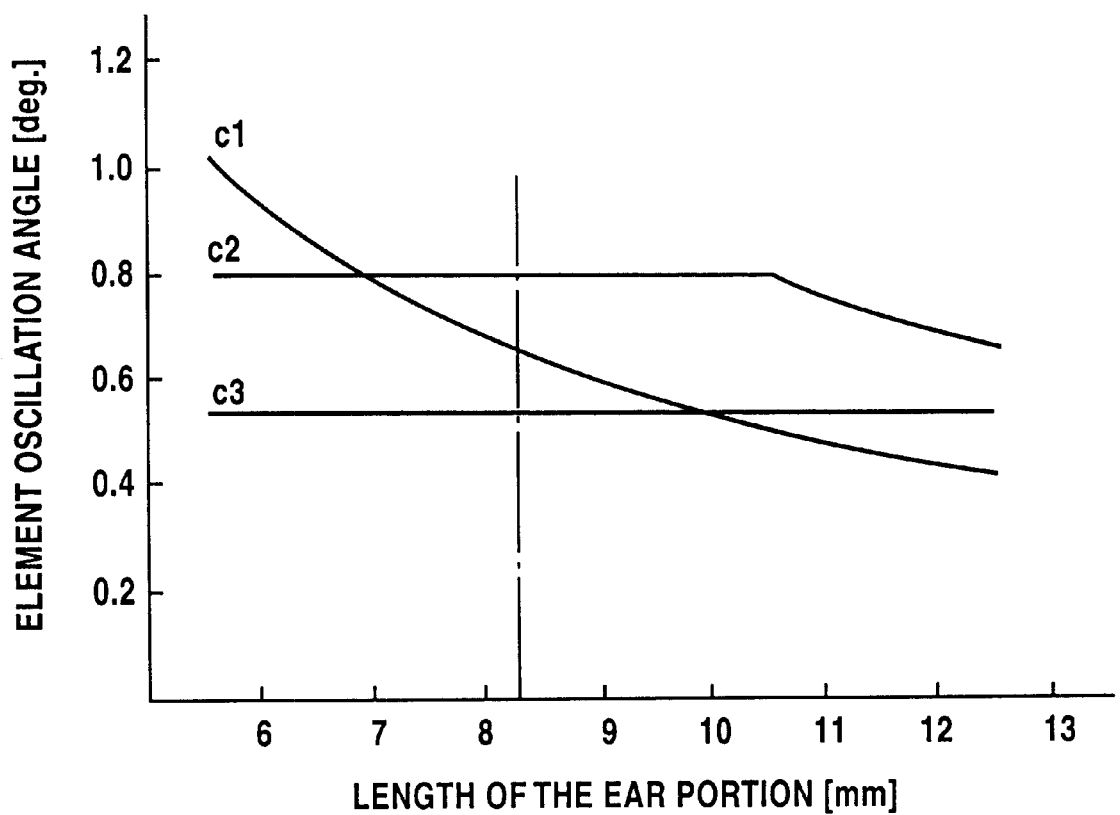
FIG. 11 is a graph showing the relationship between the length of the end of the ear portion and the oscillation angle when a gutter is given to the front and rear coupling portions of the metal element members.

FIG. 11 shows the effect of the coupling portion which becomes the shaft center when the element oscillates and shifts by the amount of clearance generated from the difference in the diameters of the concave and convex sides. This figure shows a case when the difference in the diameter of the concave side (hole 15) and convex side (nose 14) couplings is set to 0.1 mm and is an example of the effect when the center of the concave side coupling and the center of the convex side coupling allow the shaft center to shift +/−0.05 mm.

The designation c1 shown in FIG. 11 is an example when the concave side coupling drops 0.05 mm with respect to the convex side. Further, c2 shows when the shaft centers of both couplings match and c3 shows when the concave side coupling is 0.05 mm over the convex side coupling.

Compared to a conventional element, the element whose length of the ear portion shown in the embodiment is extended to 10.5 mm has no effect compared to the conventional element at the state of c3. At position c2 it is understood that there is the effect of reducing the oscillation angle compared to the conventional element by 0.0936 deg. and at position c3 the angle is reduced by 0.15116 deg. compared to the conventional element.

As shown above, it is understood that the elements of the metal belt of the present invention exhibit unstable behavior close to the driven pulley outlet shown in FIG. 4 and lengthening of the ear portion is seen at the region where a gap occurs between the saddle surface and the ring.

In addition, the embodiment described above illustrated as one working example of the metal belt of the present invention a case in which the cross-sectional shape of the ring 20 and the shape of the lower surface of the ear portion 12a were rectilinear and the shape of the saddle surface 11a had a gentle convex surface. This invention, however, is not restricted to these shapes and can be applied in like manner for any combination of these shapes (for example a combination of convex surfaces and concave surfaces).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 11-002733 filed on Jan. 8, 1999, which is incorporated herein by reference.

What is claimed is:

1. A metal belt, comprising:

a pair of metal rings, each metal ring including a plurality of endless metal bands stacked on each other; and a plurality of metal elements supported along the metal rings, each metal element including a laterally extending body portion and an ear portion connected centrally at the body portion and extending laterally therefrom to form a pair of lobes extending oppositely of each other such that each lobe defines a slot between the body portion and the lobe, each slot being sized and adapted to receive a respective one of the metal rings with a clearance, each metal element having a cylindrical shaped nose portion connected to one of a front surface and a rear surface of the ear portion and projecting forwardly of the ear portion and a corresponding hole formed into a remaining one of the front surface and the rear surface of the ear portion with respective ones of the nose portions and holes being sized to engage with corresponding holes and nose portions of consecutive ones of the metal elements so that the metal elements can pivot about a center of the respective nose portions, wherein each metal element is constructed to satisfy a relationship that $L_\alpha/L_\beta > 0.8$ such that $L_\alpha$ is a lateral distance between the center of the nose portion and a contact point $P_\alpha$ defined when the metal element pivots to form point contact between one of the pair of lobes and a corresponding one of the pair of metal rings and $L_\beta$ is a lateral distance between the center of the nose portion and a contact point $P_\beta$ defined when the metal element pivots to form point contact between the other metal ring and the body portion.

2. A metal belt as set forth in claim 1 comprised such that a $\alpha < \beta$ when a ring is located at the center position of an element slot when an oscillation angle that causes an outermost peripheral surface of the ring and a surface facing the bottom of the elements relative to said surface is $\alpha$ and an oscillation angle that causes an innermost peripheral surface of the ring and a surface facing the top of the elements is $\beta$ at the moment when the elements oscillate centered on a center shaft of the nose.

3. A metal belt as set forth in claim 1 characterized by the diameter of an approximate cylindrical shaped hole portion being larger than the diameter of said nose.

* * * * *